United States Patent
Gottwald et al.

(10) Patent No.: US 9,823,540 B2
(45) Date of Patent: Nov. 21, 2017

(54) OPTICAL IQ MODULATOR CONTROL

(71) Applicant: Xieon Networks S.a.r.l., Luxemburg (LU)

(72) Inventors: Erich Gottwald, Holzkirchen (DE); Harald Rohde, Munich (DE)

(73) Assignee: Xieon Networks S.a.r.l., Senningerberg (LU)

( * ) Notice: Subject to any disclaimer, the term of this patent is extended or adjusted under 35 U.S.C. 154(b) by 0 days.

(21) Appl. No.: 14/777,853

(22) PCT Filed: Mar. 3, 2014

(86) PCT No.: PCT/EP2014/054021
§ 371 (c)(1),
(2) Date: Sep. 17, 2015

(87) PCT Pub. No.: WO2014/146887
PCT Pub. Date: Sep. 25, 2014

(65) Prior Publication Data
US 2016/0282699 A1    Sep. 29, 2016

(30) Foreign Application Priority Data
Mar. 20, 2013 (EP) .................................... 13160100

(51) Int. Cl.
*H04B 10/00* (2013.01)
*G02F 1/225* (2006.01)
(Continued)

(52) U.S. Cl.
CPC ..... *G02F 1/2255* (2013.01); *H04B 10/07955* (2013.01); *H04B 10/50577* (2013.01);
(Continued)

(58) Field of Classification Search
CPC ........................ H04B 10/548; H04B 10/07955
See application file for complete search history.

(56) References Cited

U.S. PATENT DOCUMENTS 5,835,212 A * 11/1998 Kissa .................... G02F 1/3136
356/477
6,211,996 B1 * 4/2001 Fuse ........................ H03C 7/00
359/238
(Continued)

FOREIGN PATENT DOCUMENTS

| EP | 1921486 A1 | 5/2008 |
| EP | 1927883 A1 | 6/2008 |
| EP | 2003486 A2 | 12/2008 |

OTHER PUBLICATIONS

International Search Report and Written Opinion, PCT/EP2014/054021, dated Mar. 28, 2015, pp. 1-12.
(Continued)

*Primary Examiner* — Danny Leung
(74) *Attorney, Agent, or Firm* — Nelson Mullins Riley & Scarborough LLP

(57) ABSTRACT

An optical IQ modulator (IQM) including two parallel Mach-Zehnder modulators (MZM1, MZM2) generates single sideband data signals. A control unit (18) generates additional optical single sideband pilot signals (PS1, PS2) positioned in a lower and a higher sideband respectively, and also further pilot signals (PS3, PS4) in both sidebands. A IQ modulator output signal (MOS) converted into electrical monitoring signals (MOS) and monitored. A control unit (18) selects control signals (CS12, CS3, CS4) and controls the IQ modulator via its bias ports (6, 7, 8) till the power transfer functions (PTF) of the Mach-Zehnder modulators (MZM1, MZM2) and the phase difference (ΔΦ) between their output signals is optimized.

15 Claims, 7 Drawing Sheets

(51) Int. Cl.
*H04B 10/50* (2013.01)
*H04B 10/079* (2013.01)
*H04B 10/548* (2013.01)
*H04L 5/00* (2006.01)
*G02F 1/21* (2006.01)
(52) U.S. Cl.
CPC ......... *H04B 10/548* (2013.01); *H04L 5/0048* (2013.01); *G02F 2001/212* (2013.01)

(56) References Cited

U.S. PATENT DOCUMENTS

| | | | | |
|---|---|---|---|---|
| 6,915,082 | B2* | 7/2005 | Yano | H04B 10/25137 398/184 |
| 7,146,103 | B2* | 12/2006 | Yee | H04B 10/2507 398/152 |
| 7,209,660 | B1* | 4/2007 | Yee | H04B 10/50 398/141 |
| 7,447,436 | B2* | 11/2008 | Yee | H04B 10/50 398/152 |
| 7,620,318 | B2* | 11/2009 | Li | H04B 10/40 398/155 |
| 2005/0213862 | A1* | 9/2005 | Kawanishi | G02F 1/0123 385/1 |
| 2005/0220385 | A1* | 10/2005 | Kawanishi | G02F 1/3136 385/1 |
| 2007/0269223 | A1* | 11/2007 | Noguchi | H04B 10/505 398/198 |
| 2010/0021166 | A1* | 1/2010 | Way | H04J 14/02 398/79 |
| 2016/0065314 | A1* | 3/2016 | Nazarathy | H04B 10/6151 398/202 |
| 2016/0282699 | A1* | 9/2016 | Gottwald | H04B 10/50577 |

OTHER PUBLICATIONS

Griffin, R. et al., "10 Gb/s optical differential quadrature phase shift key {DQPSK} transmission using GaAs/AlGaAs integration," Opical Fiber Communications Conference, (OFC)Post Conference Technical Digest, Post Deadline Papers, (IEEE Cat. No. 02CH37339) Opt Soc. America Washington, DC, USA; [Trends in Optics and Photonics Series(TOPS)], IEEE, vol. TOPS. vol. 70, Mar. 17, 2001, pp. 917-919.

* cited by examiner

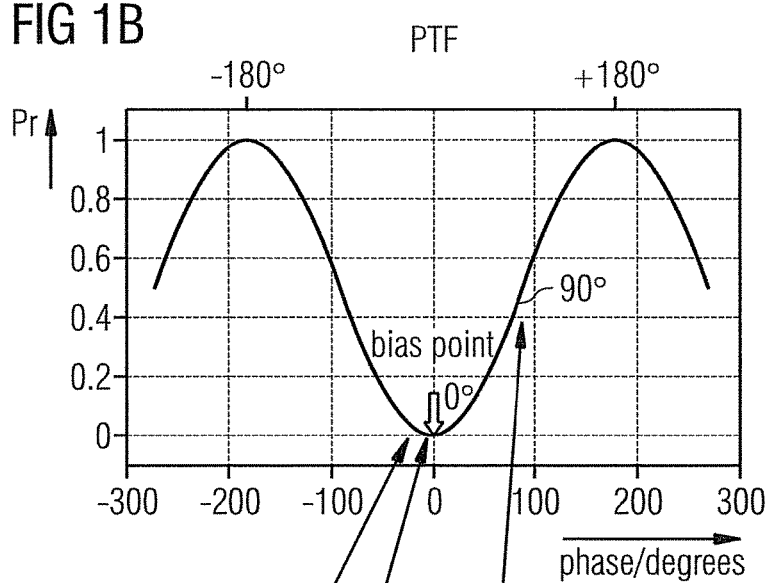
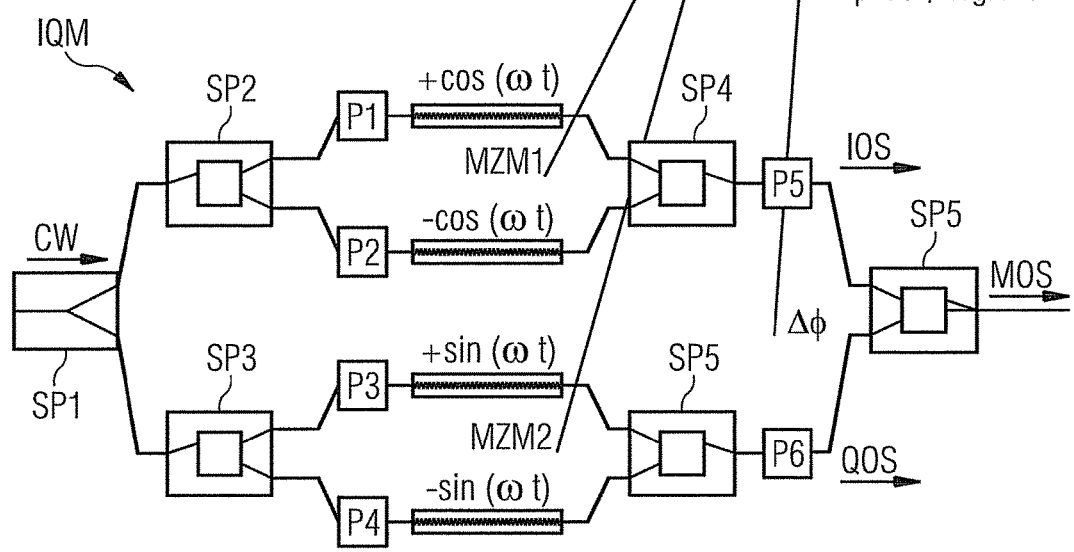

OPTICAL IQ MODULATOR CONTROL

FIELD OF THE INVENTION

The invention relates to a method and an arrangement for controlling an optical IQ modulator.

CROSS REFERENCE TO RELATED APPLICATIONS

This application is a 35 U.S.C. 371 national stage filing of International Application No. PCT/EP2014/054021, filed on Mar. 3, 2014. The contents of the aforementioned applications are hereby incorporated by reference in their entireties.

BACKGROUND OF THE INVENTION

In optical transmission systems optical signals are transmitted over an optical fiber. Different kinds of modulation and associated types of modulators are used to generate appropriate transmission signals. A common modulator is the QAM (Quadrature Amplitude Modulation) or IQ modulator (I—in-phase, Q—quadrature). A common structure of such an IQ modulator is a nested MZM (Mach-Zehnder Modulator), which consist of two combined parallel working Mach-Zehnder modulators. Optical IQ modulators, independent of their respective realization, have to be adjusted internally in order to deliver the wanted optical waveform. Misaligned modulators insert unwanted spurious by-signals into the optical waveform which distort the optical transmission. The adjustment has to be online, i.e. during operation of the device in order to avoid traffic interruption. The adjustment is either continuously or it takes place every few seconds to minutes. Other problems which have to be solved in case of very high requirements on signal quality is to minimize the effects of the non perfect transfer functions of the analog modulator drivers and a not perfect balance, optical power and electro-optic transfer function within the IQ modulator.

The basic arrangement of an IQ modulator is shown in FIG. 1.

State of the art to adjust the bias of MZM1 and MZM2 is to apply a pilot tone with a frequency f3 on the phase shifters P1, P2 and to apply a further pilot tone with a frequency of f4 on P3, P4, and with help of a monitor diode to minimize the output signals at the modulation frequencies f3 and f4 respectively (and/or maximize the output signals at double modulation frequencies 2*f3 and 2*f4; the pilot tones with frequencies f3 and f4 are shown later in the embodiments of the invention).

The more sophisticated task is to set the 90° point between output components IOS and QOS of the main MZM to achieve e.g. ideal quadrature phase-shift modulation or single sideband modulation.

An IQ modulator and a simple biasing method is e.g. described by Kaoru Higuma et al. in IEICE 2006, Electronics Express Vo. 3; No. 11, pages 234-242, DOI: 10.1587/elex. 3.238. The IQ modulator comprises only one phase shifter electrode per MZM to control the transfer function and to control the phase difference between the signals output from the parallel MZMs This multifunctional modulator can work as a single sideband modulator, a QPSK modulator and so on. It is necessary to control the modulator automatically to avoid unstable operation.

The patent US 2007/0133918 A1, which is included by reference, describes also an IQ modulator with two parallel MZMs wherein only one phase shifter electrode per MZM is necessary to control the transfer function and another phase shifter electrode is necessary to control the phase difference between the output signals from the parallel MZMs.

The patent also discloses a method and system for automatic feedback control of the optical IQ modulator for generating of a quaternary phase-shift-keyed signal without pilot tones. The method comprises the steps of detecting a part of an output signal from the QPSK modulator and processing the signal in the frequency domain to optimise the output data quality by automatic feedback control. The method comprises minimizing (or maximizing) output signals with the help of a gradient algorithm by applying a dithering voltage to an allocated phase shifter. A phase shift of $\Delta\Phi=\pi/2$ is controlled by adjusting a minimum RF output power.

The method described above for use with IQ modulation like (D)-QPSK is easy to implement but has some severe disadvantages with respect to single sideband modulation. If the IQ modulator is used for single side-band generation with many carriers which may be individually switched on or off, this prevents an algorithm who adjusts the 90° setting in the main MZM with help of minimizing the RF output power.

Another disadvantage of the method is the need for partial derivatives this implies low noise monitor signals and the absence of electrical disturbances by imperfect electrical analog and digital circuitry. Additionally a broadband monitor diode is needed for power detection within a several GHz wide band.

OBJECTS AND SUMMARY OF THE INVENTION

It is an object of the invention to control an IQ modulator.

The present disclosure provides a method for controlling an optical IQ modulator, including a first Mach-Zehnder modulator and a second Mach-Zehnder modulator, which output signals are added with a phase difference of 90°, comprising the steps of generating a first single sideband pilot signal in an upper sideband and generating a second single sideband pilot signal in a lower sideband;

converting optical IQ modulator output signals into electrical monitoring signals;

selecting a phase control signal from the monitoring signals corresponding to a conversion product of both said pilot signals; and varying the phase difference between components (primary pilot signals) of the single sideband pilot signals output by the first Mach-Zehnder modulator and the second Mach-Zehnder modulator till said phase control signal becomes a minimum.

The invention solves the problem of adjusting the 90° phase difference of the main MZM by generating a control signal which power depends on the quality of the single sideband generation and whose frequency can be far below 1 MHz. The detection of the minimum power is a preferred solution.

An equivalent solution is the detection of a maximum power at a second inverse output of the IQ modulator. The adjustment of the 90° phase is realized independent of any data signals.

According to one example, the first pilot signal and the second single sideband pilot signal are constant wave signals having different frequencies, and the phase control signal corresponds to a signal with a beat frequency of these pilot signals.

The use of two pilot signals having different frequencies leads to a basic solution of a control method. Depending on the implementation of the IQM (additional output ports for MZM1 and MZM2) these pilot signals may be used for further adjustments.

According to one example, the first single sideband pilot signal is additional modulated by a first carrier modulation signal having a first carrier modulation frequency and the second single sideband pilot signal is additional modulated by a second carrier modulation signal having a second carrier modulation frequency; and the phase control signal is selected from the monitoring signals corresponding to a signal with a beat frequency of the carrier modulation signals.

Further in one example, the first single sideband pilot signal and the second single sideband pilot signal have a same basic modulation frequency.

Both optical single sideband pilot signals of both sidebands are generated by modulating the optical carrier. The basic modulation signals (electric carrier) have an identical frequency. Each basic modulation signal is itself modulated by a low frequency carrier modulation signal, e.g. generating amplitude modulated (ASK) optical pilot signals. The phase control signal corresponding to a signal with a beat frequency of the carrier modulation signals is derived from the monitoring signals and evaluated to adjust the IQM phase angle.

According to one example, the method comprises further the steps of
generating a third optical pilot signal in the first Mach-Zehnder modulator;
generated a fourth optical pilot signal in the second Mach-Zehnder modulator and
converting the third and the fourth optical pilot signal into further electrical monitoring signals which are used as power control signals;
selecting and monitoring and the further power control signals; and
optimizing power transfer functions of the first and the second first Mach-Zehnder modulator according to an evaluation of said power control signals.

An alternative embodiment comprises the steps of
converting an output signal of the first Mach-Zehnder modulator and an output signal of the second Mach-Zehnder modulator into monitoring signals;
selecting and monitoring power control signals corresponding to primary pilot signals of the first and/or second single sideband pilot signals; and
optimizing the power transfer functions of the first Mach-Zehnder modulator and the second first Mach-Zehnder modulator according to an evaluation of said primary pilot signals.

The monitoring of the further pilot signals or the primary pilot signals (generated by MZM1 and MZM2) of the single sideband pilot signals output from MZM1 and MZM2 solves the problems of adjusting the parallel MZM1 and MZM2 including the automatic compensation of an imperfect modulator and modulator driver (especially imbalances in the transfer function for I and Q signal) properties and including power adjustment. Advantageously is the power minimum (bias point 0° in FIG. 1b) used for PTF adjustment. Alternatively a maximum at the double modulation frequency may be used.

The first Mach-Zehnder modulator, the second first Mach-Zehnder modulator, and the IQ modulator are controlled by bias (control) signals.

The pilot modulation signals may be combined with data modulation signals or with the bias signals which determine the power transfer functions of the first and the second Mach-Zehnder modulator.

The invention may be advantageously used if single sidebands data signals are generated in an upper and a lower optical sideband by the data modulation signals (RI(t); RQ(t)).

An optimized single sideband generation of the pilot tones leads to generation of optimized single sideband data signals.

A system for controlling an IQ modulator, including a first Mach-Zehnder modulator and a second parallel Mach-Zehnder modulator, comprises a control unit arranged for
generating a first single sideband pilot signal in an upper sideband and a second single sideband pilot signal in a lower sideband, and for
receiving electrical monitoring signals corresponding to conversion products of said first and second single sideband pilot signals emitted at an IQ modulator output; and for
selecting and monitoring at least one phase control signal and for generating a phase bias signal controlling a phase difference between components of single sideband pilot signals output by the first Mach-Zehnder modulator and the second Mach-Zehnder modulator till said phase control signal becomes a minimum.

The optical single sideband pilot signals may be constant wave signals with different frequencies and the phase control signal corresponds to a signal with a beat frequency of the single sideband pilot signals.

In another embodiment
the first single sideband pilot signal has a basic frequency and is additional modulated by a first carrier modulation signal having a first carrier modulation frequency, and the second single sideband pilot signal has a basic frequency and is additional modulated by a second carrier modulation signal having a different carrier modulation frequency; and
the phase control signal is selected from the monitoring signals corresponding to a signal with a beat frequency of the carrier modulation signals.

The control unit is arranged for generating further control signals and for detecting and evaluating corresponding power control signals for controlling power transfer functions of the first Mach-Zehnder modulator and the second Mach-Zehnder modulator.

The control unit and the IQ modulator are arranged
for monitoring the output signals emitted from the first Mach-Zehnder modulator and/or the second Mach-Zehnder modulator and converted into the monitoring signals, and
for selecting and evaluating power control signals corresponding to primary pilot signals of the single sideband pilot signals for controlling power transfer functions of the first Mach-Zehnder modulator and the second Mach-Zehnder modulator.

The system comprises means for
combining modulation signals respectively their I, Q components generating the pilot signals with bias signals and
feeding the combined modulation signals to power bias ports of the IQ modulator.

More details of the invention and their advantages are described in the description.

BRIEF DESCRIPTION OF THE DRAWINGS

Examples of the invention including a presently preferred embodiment are described below with reference to accompanying drawings, where FIG. 1 is a schematic diagram of an optical nested IQ modulator and its transfer function.

DETAILED DESCRIPTION OF THE INVENTION

FIG. 1a illustrates a block diagram of a of a nested IQ modulator. The IQ modulator IQM comprises a first or "I" Mach-Zehnder modulator MZM1 and a parallel second or "Q" Mach-Zehnder modulator MZM2. An optical constant wave signal CW is fed as an optical carrier via splitters SP1-SP3 to the MZM1 and MZM2. The constant wave signal is preferable modulated in the upper MZM1 by a modulation signal cos ωt in the upper branch and by −cos ωt in the lower branch (push-pull concept).

In the MZM2 the constant wave signal may be—depending on the purpose—modulated by sin ωt and by −sin ωt or phase shifted modulation signals.

An ideal standardized transfer function PTF of FIG. 1b depicts the relative power Pr as a function of the phase between the optical carriers of the modulator branches of MZM1 or MZM2. As already described above, depending on the phase difference between the output signals of the upper and lower branch is the MZM1 or MZM2 output signal zero if the phase difference between the parallel branches is 180° (including splitters, marked as bias point 0°), and the transfer function is maximal if the phase difference is zero between the upper and the lower branch.

Preferably a minimum power output value (or maximum value at a not shown second IQM output) is used to bias (adjust) the MZM1 and MZM2. According to a preferred embodiment of the invention a unique pilot signal is fed to each MZM and the phase shifters P1-P4 are varied till the transfer function reaches a minimum as depicted in the standardized power transfer function PTF of FIG. 1b. Of course, the output powers of the parallel modulators MZM1 and MZM2 have also to be adjusted to equal values.

Further, the phase shifters P5 and P6 have to be adjusted that the phase difference ΔΦ between the output signals IOS and QOS of MZM1 and MZM2 is 90°. Regarding the IQM as a single modulator the same standardized power transfer function can be regarded.

Figure 2:
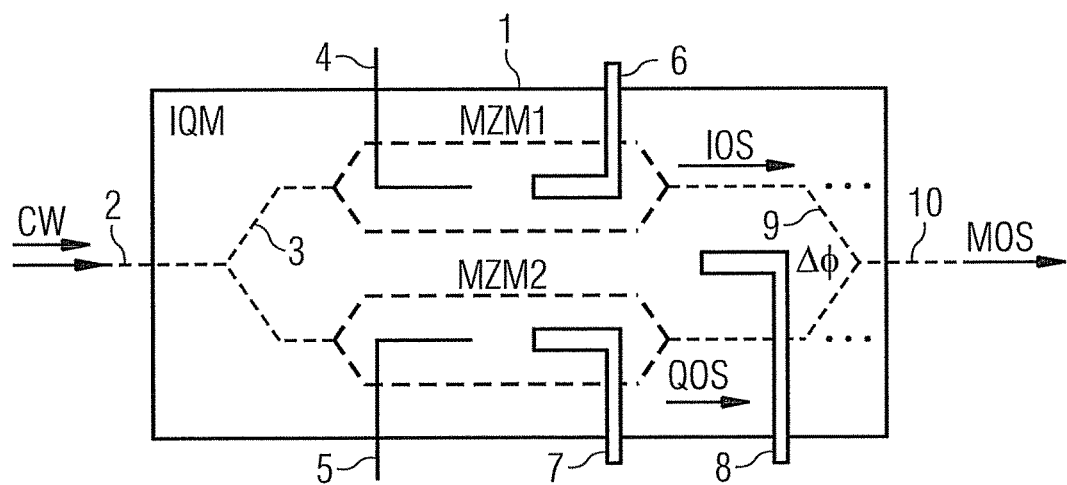
FIG. 2 is a schematic diagram of second embodiment of an optical IQ modulator.

Before details of the invention are described a second possible implementation of the IQM, shown in FIG. 2, is regarded.

The phase shifters P1 and P2 are substituted by a single bias electrode with (PTF) power bias port 6, the phase shifters P3 and P4 are implemented as a second single bias electrode with (PTF) power bias port 7, and the phase shifters P5 and P6 are implemented as a single bias electrode controlled via phase shift bias port 8. The modulation (signal input) ports are 4 and 5.

The IQM shown in FIG. 1 is a preferred implementation to be used in an arrangement according to the invention because each pair of phase shifters P1 and P2; P3 and P4, is contrariwise driven keeping the phase of output signals IOS, QOS of the allocated MZMs constant (chirp free). The IQM output signal MOS is emitted at output port 10.

Figure 3:
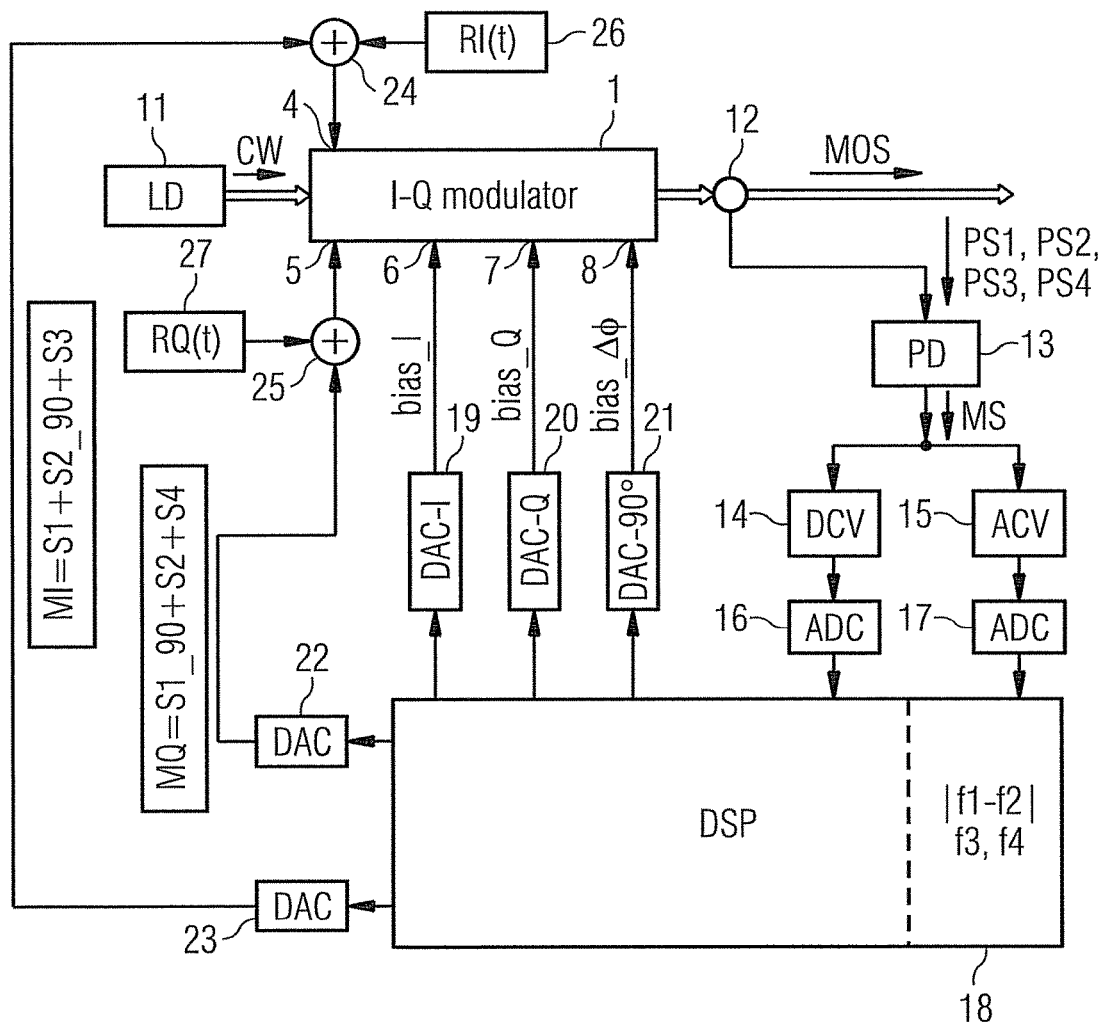
FIG. 3 is a schematic diagram of an IQ modulator control.

FIG. 3 shows a basic diagram of a control arrangement comprising the IQ modulator 1. In this example a "double single sideband data signal" is generated comprising an upper and a lower "single" sideband, each sideband carrying a plurality of different data channels. Accordingly, RF (radio frequency) modulation signals RI(t) and RQ(t) are derived from a plurality of data signals. These modulation signals correspond to data channels (signals) and are already modulated onto electrical carriers. These data modulation signals are emitted by modulation sources 26 and 27 and fed to the modulation ports 4 and 5 of the upper MZM1 and the lower MZM2 respectively modulating the allocated portions of the optical carrier CW (constant wave) which is generated by a CW source 11.

The control arrangement includes a control unit 18 implemented as digital signal processor (DSP) which calculates pilot modulation signals S1, S2 for ΔΦ (phase difference) control and further pilot modulation signals S3 and S4 for MZM1 and MZM2 power transfer function control.

I (in-phase/real) and Q (quadrature/imaginary) components of the pilot modulation signals S1 and S2 are combined with further pilot modulation signals S3 and S4 and converted by digital-analog converters 22, 23. The resulting combined modulation signals MI, MQ are added to the appropriate RF (data) modulation signals RI(t) and RQ(t) by adders 24 and 25 and then fed to the IQM modulation ports 4 and 5.

The control unit 18 also calculates DC (direct current) control signals which are also converted into analog bias signals bias_I, bias_Q, bias_ΔΦ by digital-analog converters 19-21.

Figure 6:
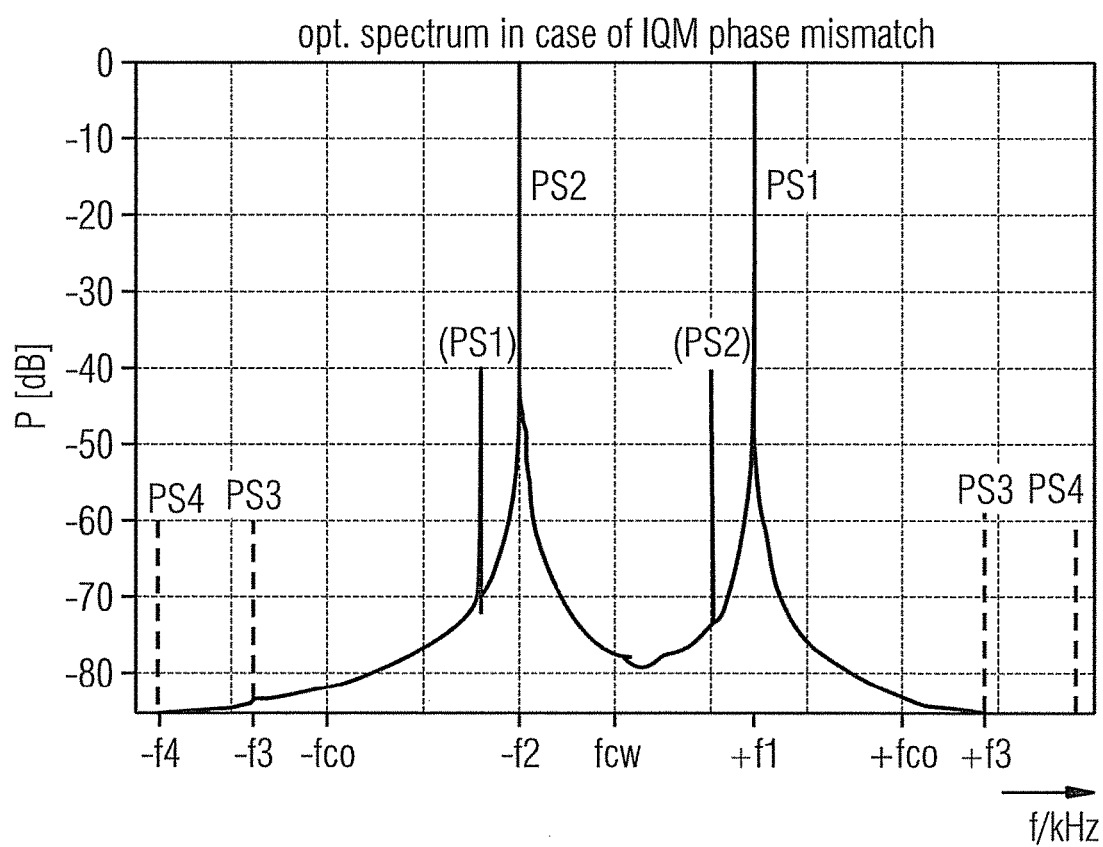
FIG. 6 is a spectral diagram in the optical domain.

The combined pilot modulation signals MI, MQ generate an optical IQM output signal MOS comprising beside optical single sideband data signals optical single sideband pilot signals PS1, PS2, and further optical pilot signals PS3, PS4 (FIG. 6). For controlling the IQM, the output signal MOS is tapped by a splitter 12, and a small amount of the output signal is fed to a low frequency photo diode 13 where the optical pilot signals PS1, PS2, PS3, PS4 are converted into electrical monitoring signals MS (data signals may be absent or ignored). DC and AC values DCV, ACV of the monitoring signals are determined from the monitoring signals by a DC value unit 14 and an AC value unit 15 and then converted into digital samples by analog-digital converters 16, 17 for selecting control signals and further processing.

Figure 4:
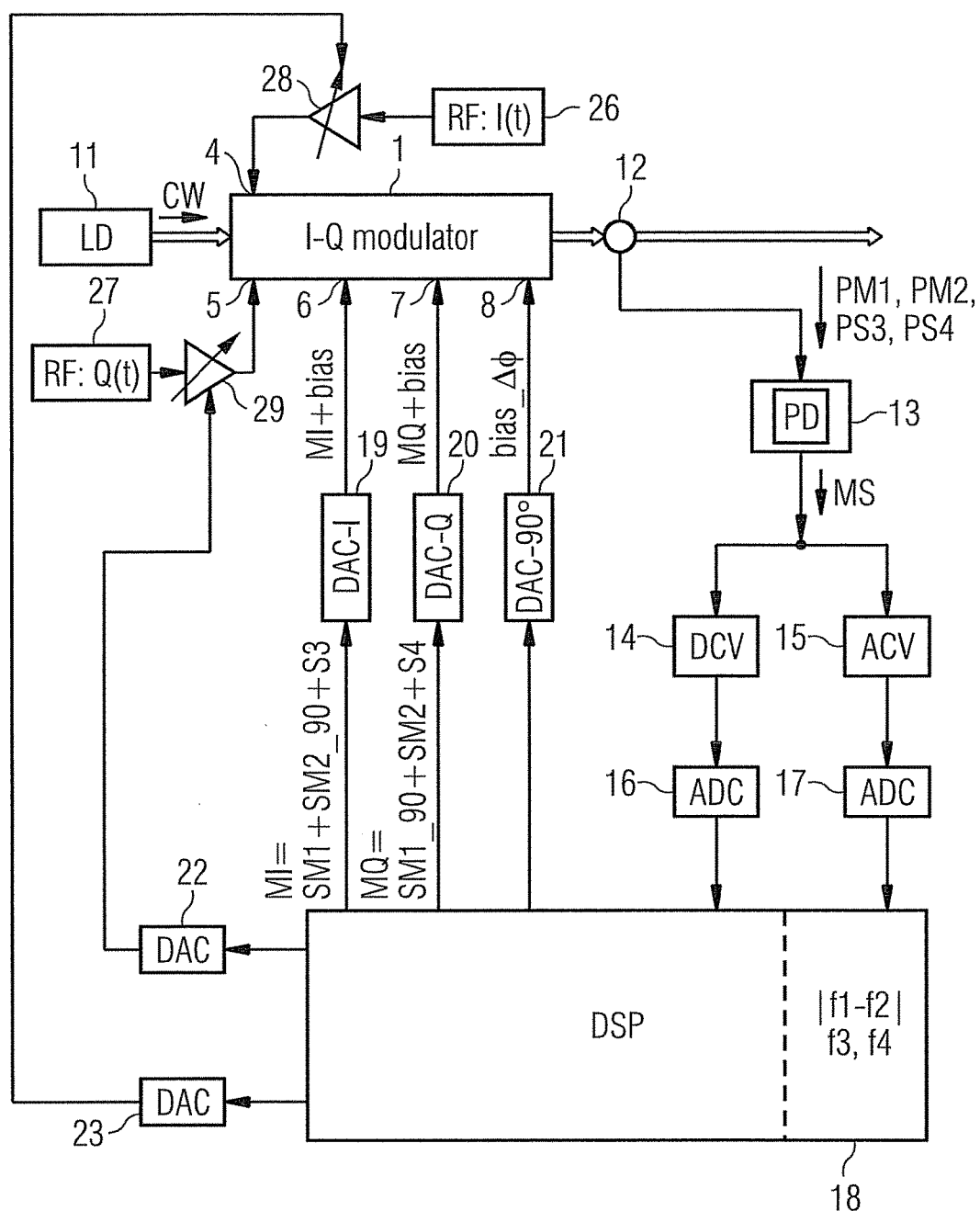
FIG. 4 is a second preferred embodiment of an IQ modulator control.

FIG. 4 shows a second preferable embodiment of an IQM control arrangement. In contrast to the embodiment depicted in FIG. 3 the pilot modulation signals S1, S2 respectively their I, Q components and the further pilot modulation signals S3, S4 are now added to the bias signals bias_I and bias_Q. Now, the RF modulation signals I(t) and Q(t) can be controlled—indicated by adjustable amplifiers 28, 29—without an effect on the bias and pilot signals.

The sophisticated task of setting the phase difference ΔΦ=90° is considered first regarding the control unit depicted in FIG. 3. The basic idea of the invention is to generate the first optical single sideband pilot signal PS1 in a first or upper sideband and the second optical single sideband pilot signal PS2 in a second or lower sideband and to control the quality of single sideband generation. These pilot signals are referred to as first and second pilot signal below.

The single sideband generation of the first pilot signal is achieved by modulating the carrier signal of the first MZM1 with the first pilot modulation signal S1 having a frequency f1 generating a first primary pilot signal and modulating the carrier signal of the second MZM2 with a 90° shifted first pilot modulation signal S1_90° generating a phase shifted first primary pilot signal. The second pilot signal PS2 is generated by "driving" the MZM2 with a second pilot modulation signal S2 having a second frequency f2 and the MZM1 with a 90° shifted pilot modulation signal S2_90° generating associated second primary pilot signals. A primary pilot signal output by the first MZM1 is combined with a phase shifted primary pilot signal output by the second MZM2 to produce the single sideband pilot signal (single sideband data signals are generated accordingly). The output signals IOS and QOS (FIG. 1, FIG. 2) comprise these primary pilot signals. The combination of these components results in the single sideband signals. The generation of single sideband signals by an IQ modulator is common knowledge to those skilled in the art.

Figure 5:
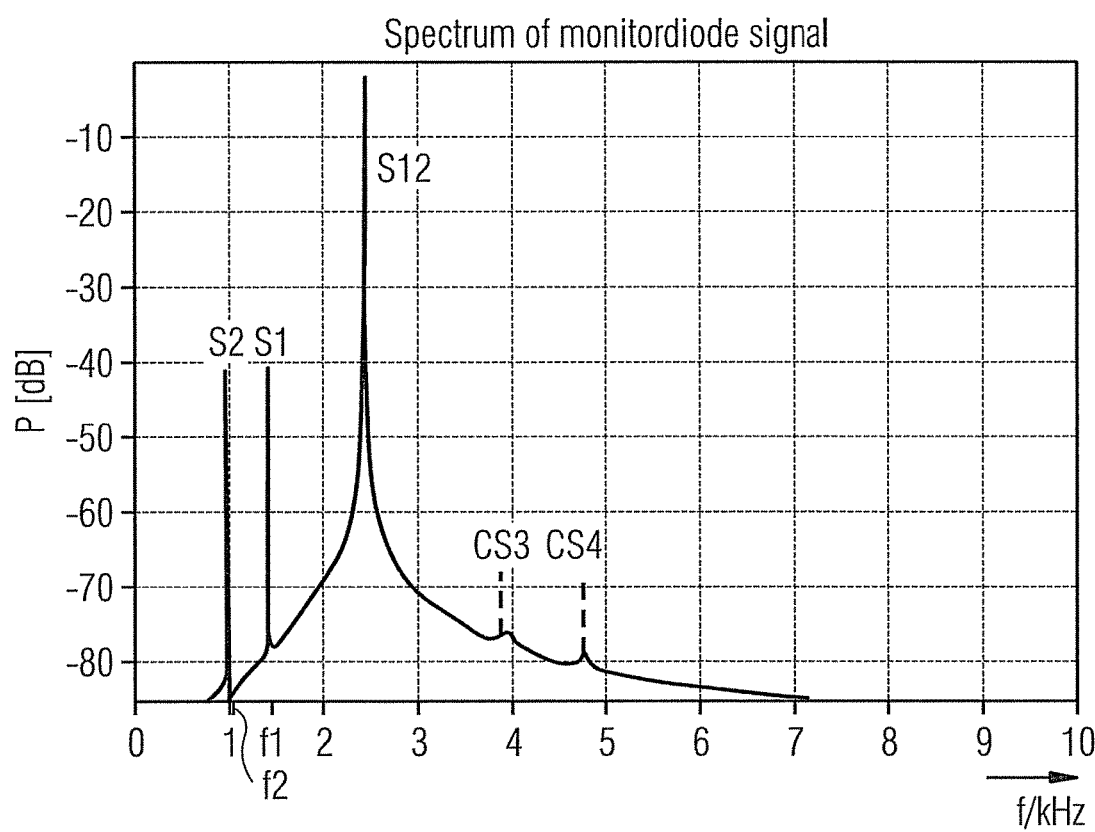
FIG. 5 is a spectral diagram in the electrical domain.

Regarded is now the use of the generated single sideband pilot signals PS1, PS2 for ΔΦ adjustment. For better understanding the control method it is assumed (anticipating the result of the IQM control) that the IQM is perfectly balanced and hence ideal optical single sideband pilot signals PS1 and PS2 are generated at different frequencies fcw+f1 and fcw−f2 (e.g. f1=1.41 kHz, f2=1 kHz). This is achieved when the I and Q components of the single sideband pilot signals are ideally combined (without data signals and further pilot signals PS3, PS4 the components of both single sideband pilot signals are identical with IOS and QOS respectively). The monitoring signals MS are derived from the IQM output signal MOS and the pilot signals are converted into the electrical domain and depicted in FIG. 5 showing the power P as a function of the frequency f. In the ideal case beside the pilot modulation signals S1, S2 (f1=1.41 kHz, f2=1 kHz) only a conversion modulation product S12 is generated (the same designation "S" is used for modulation and monitoring signals in the electrical domain).

Figure 7:
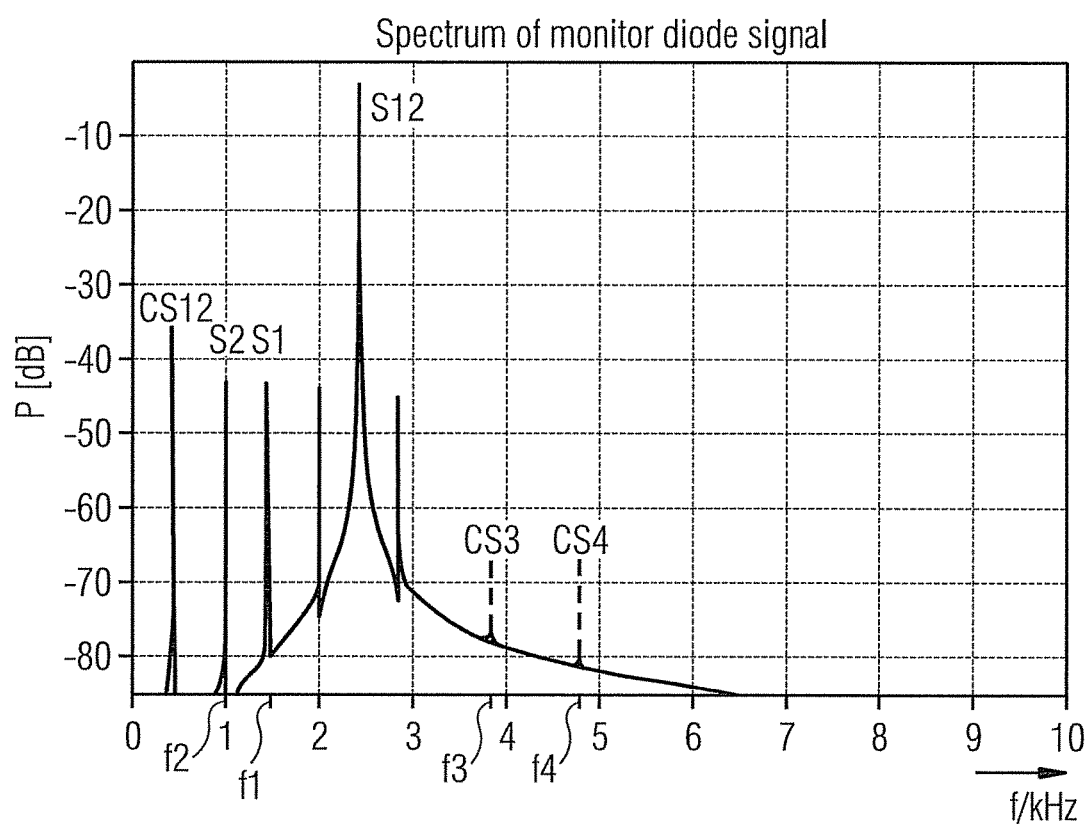
FIG. 7 is a second spectral diagram in the electrical domain indicating a phase error.

If the angle difference ΔΦ between the MZM1 and MZM2 output signals is unequal to 90° both optical pilot signals PS1, PS2 (f1=1.41 kHz, f2=1 kHz) are not generated as pure single sideband signals but components of these signals are also generated in the opposite lower or higher sideband depicted as pilot signals (PS1), (PS2) in an optical power spectrum FIG. 6. According to optical-electrical conversion also additional monitoring signals MS resulting from frequency mixing (at the photo diode) are gained as depicted in FIG. 7.

One (or more) of the unique monitoring signals, a phase control signal CS12 (FIG. 7) with a beat frequency according to the frequency difference abs(f1−f2) between PS1 and PS2 is selected from the monitoring signals MS by the control unit 18 as control variable for generating the bias signal bias_ΔΦ (control voltage) controlling the phase difference ΔΦ. The frequency difference abs(f1−f2) in this embodiment should be preferable in the range of the audio frequency band. As known to those skilled in the art, the detection of the phase control signal CS12 can be done with help of FFT components of a time interval of some 1/10 to some seconds the digitalized and stored detected monitor signal or by multiplying the monitor signal with cos(2π(f1−f2)t) and sin(2π(f1−f2)t), squaring and summing/integrating over about some 1/10s to some seconds.

The target of the "ΔΦ bias control" is to optimize the single bandwidth modulation by minimizing the monitored phase control signal CS12. A phase optimizing algorithm can be based on a gradient method or very simply be varying the bias signal "bias_ΔΦ" by a small amount with a rate according to the integration time and depending on the magnitude (f1−f2) at the sampling times t(k), t(k+1), . . . increase or decrease the bias in small steps. A dither signal may be used in another well known control method.

The second embodiment depicted in FIG. 4 uses a different kind of optical pilot signals PM1, PM2. These pilot signals are generated by electrical pilot modulation signals SM1, SM2 with a basic modulation frequency fco carrying different additional AF (audio frequency) carrier modulation signals M1, M2 with "carrier modulation frequencies" f1 and f2 (e.g. again f1=1.41 kHz, f2=1 kHz). The (electrical) modulation signals may even have identical basic modulation frequencies fco and generate therefore the pilot signals PM1 and PM2 with an optical first basic frequency fcw+fco and an optical second basic frequency fcw−fco also additional modulated by f1 and f2 respectively. ASK modulation or, with higher expenditure, each kind of "pilot signal modulation" may be used for the pilot signals. In FIG. 6 are only the relative basis frequency positions −fco and +fco of these modulated pilot signals indicated to avoid a confusing number of signals.

Corresponding to the embodiment of FIG. 3 a control signal (control variable) CS12 (the same frequencies f1 and f1 and therefore the same names are chosen as in the embodiment FIG. 3) with a beat frequency abs(f1−f2) is selected for further processing. The main advantage is that the basic frequency (or frequencies) can be chosen within a large frequency range. This modification would generate additional sidebands (not shown in FIG. 6 and FIG. 7).

In addition to the ΔΦ=90° bias control—and before a ΔΦ set-up adjustment—the power transfer function of MZM1 and MZM2 has to be optimized and their output powers have to be adjusted. To be independent of data signals further pilot signals PS3, PS4 (shown in FIG. 6 as dashed lines 6 before adjustment) are generated by the further pilot modulation signals S3 and S4 which are combined with the other pilot modulation signals S1, S2 and fed to MZM1 and MZM2 (FIG. 3, FIG. 4).

Hence, the standardized combined modulation signals MI and MQ (neglecting the amplitudes) for the first embodiment according FIG. 3 are $$MI(t)=\sin(2\pi f1^*t)+\cos(2\pi f2^*t)+\sin(2\pi f3^*t)=S1+S2\_90+S3;$$

$$MQ(t)=\cos(2\pi f1^*t)+\sin(2\pi f2^*t)+\sin(2\pi f4^*t)=S1\_90+S2+S4.$$

The standardized combined modulation signals MI and MQ for the second embodiment using modulated pilot signals PM1, PM2 according FIG. 4 depend on the modulation format (neglecting the amplitudes) e.g. for ASK modulation with carrier modulation signals $$M1=\sin(2\pi f1^*t) \text{ and } M2=\sin(2\pi f2^*t):$$

$$MI(t)=\sin(2\pi fc^*t)^*\sin(2\pi f1^*t)+\cos(2\pi fc^*t)^*\sin(2\pi f2^*t)+\sin(2\pi f3^*t)=SM1+SM2\_90+S3;$$

$$MQ(t)=\cos(2\pi fc^*t)^*\sin(2\pi f1^*t)+\sin(2\pi fc^*t)^*\sin(2\pi f2^*t)+\sin(2\pi f4^*t)=SM1\_90+SM2+S4;$$

Power control signals CS3, CS4 (shown before adjustment as dashed lines in FIGS. 5 and 7) are derived from the further pilot signals PS3, PS4 and the phase shifters P1, P2 and P3, P4 are controlled by associated PTF bias (control) signals bias_I and bias_Q respectively till the output power of each additional pilot signal PS3, PS4 respectively each derived electrical power control signal CS3, CS4 becomes a minimum.

If in a further embodiment (not shown) appropriate output ports of the IQM are available, then MZM1 and MZM2 output signals IOS, QOS (FIG. 2, dotted lines) are converted into the monitoring signals MS. The primary pilot signals of PS1 and/or PS2 are selected and evaluated as power control signals. Hence, in this embodiment only the first and the second pilot signals (PS1, PS2; PM1, PM2) are required for MZM phase and power control.

It is clear for those skilled in the art that the frequencies of the pilot signals are chosen to avoid that the monitoring signals do neither interfere with each other nor with the data signals. Also, that the amplitudes of the modulation signals have to be adapted to the Mach-Zehnder modulator and the chosen control inputs.

The control unit may be additional used for adjustments and optimizing the signal quality of the data signals.

If a set up of the IQ modulator is necessary, following steps are recommendable:
1. A coarse pre-adjustment of the phase shifters monitoring the DC value of the IQM output signal MOS (with or without data signals).
2. Biasing of the parallel modulators MZM1 and MZM2.
3. Adjusting the modulation signal power.
4. Adjust the IQM phase difference.

The steps 2-3 may be repeated or be alternating executed in small steps.

The present invention is not limited to the details of the above described principles. The scope of the invention is defined by the appended claims and all changes and modifications as fall within the equivalents of the scope of the claims are therefore to be embraced by the invention. Especially analogue data processing and digital data processing is exchangeable and also adaption of further and new technical devices.

REFERENCE SIGNS

1 IQM nested Mach-Zehnder modulator
2 input
3 splitter arrangement
4 first modulation electrode
5 second modulation electrode
6 first power bias port
7 second (PTF) power bias port
8 phase shift bias port
9 combiner arrangement
10 output port
11 CW source
12 tap/coupler
13 optical-electrical converter/photo diode
14 DC power measurement
15 AC power measurement
16 analog/digital convertor
17 analog/digital convertor
18 DSP (digital signal) processing unit
19 digital/analog convertor
20 digital/analog convertor
21 digital/analog convertor
22 digital/analog convertor
23 digital/analog convertor
24 adder/combiner
25 adder/combiner
26 I modulation signal source
27 Q modulation signal source
28 amplifier
29 amplifier
CW constant wave carrier
RI(t) I data (RF) modulation signal
RQ(t) Q data (R) modulation signal
IQM IQ modulator
MZM1 I modulator/first MZM
MZM2 Q modulator/second MZM
IOS MZM1 output signal
QOS MZM2 output signal
MOS IQM output signal
DCV DC value (summed)
ACV AC value
P1-P4 phase shifter
S1 first pilot modulation signal
S2 second pilot modulation signal
S3 third pilot modulation signal
S4 fourth pilot modulation signal
f1 frequency of S1
f2 frequency of S2
f3 frequency of S3
f4 frequency of S4
MI combined (analog) I modulation signal
MQ combined (analog) Q modulation signal
PS1 first pilot signal
PS2 second pilot signal
S12 modulation product
PC1-2 phase control signal (control variable)
PS3 third pilot signal
PS4 fourth pilot signal
PM1 modulated first pilot signal
PM2 modulated second pilot signal
M1 first pilot carrier modulation signal
M2 second pilot carrier modulation signal
SM1 first pilot PM1 modulation signal
SM1 second pilot PM2 modulation signal
f frequency
f1 modulation frequency of S1
f2 modulation frequency of S2
fco basic modulation frequency
f1 carrier modulation frequency of PM1
f2 carrier modulation frequency of PM2
CS12 phase control signal
CS3 power control signal MZM1
CS4 power control signal MZM2
PTF power transfer function
bias_I PTF bias signal of MZM1
bias_Q PTF bias signal of MZM2
bias_$\Delta\Phi$ phase bias signal
Pr relative power
P power

The invention claimed is:

1. Method for controlling an optical IQ modulator, including a first Mach-Zehnder modulator and a second Mach-Zehnder modulator, which output signals are adjusted to have a phase difference of 90° and are added;
comprising the steps of
generating by the first Mach-Zehnder and the second Mach-Zehnder modulator a first single sideband pilot signal in an upper sideband and generating a second single sideband pilot signal in a lower sideband;

converting by an optical-electrical converter optical IQ modulator output signals into electrical monitoring signals;

selecting by a control unit a phase control signal from the monitoring signals (MS) corresponding to a conversion product of said first and second single sideband pilot signals; and varying by phase shifters a phase difference between components of the single sideband pilot signals output by the first Mach-Zehnder modulator and the second Mach-Zehnder modulator until said phase control signal becomes a minimum.

2. The method according claim 1, wherein
the first single sideband pilot signal and the second single sideband pilot signal are constant wave signals having different frequencies; and
the phase control signal corresponds to a signal with a beat frequency of the first and second single sideband pilot signals.

3. The method according claim 1, wherein
the first single sideband pilot signal has a first basic frequency and is additionally modulated by a first carrier modulation signal having a first carrier modulation frequency and the second single sideband pilot signal has a second basic frequency and is additionally modulated by a second carrier modulation signal having a second carrier modulation frequency; and
the phase control signal corresponds to a signal with a beat frequency of said carrier modulation signals.

4. The method according claim 3, wherein
the first single sideband pilot signal and the second single sideband pilot signal have a same basic modulation frequency (fco).

5. The method according to claim 1, comprising further the steps of
generating a third optical pilot signal in the first Mach-Zehnder modulator;
generating a fourth optical pilot signal in the second Mach-Zehnder modulator;
converting the third and the fourth optical pilot signal into further electrical monitoring signals;
selecting power control signals from the converted third and the fourth optical pilot signal and monitoring the power control signals; and
optimizing power transfer functions of the first and the second first Mach-Zehnder modulator according to an evaluation of said power control signals.

6. The method according to claim 1, comprising further the steps of
converting an output signal of the first Mach-Zehnder modulator and an output signal of the second Mach-Zehnder modulator into monitoring signals;
selecting and monitoring power control signals corresponding to primary pilot signals of the first and/or second single sideband pilot signals; and
optimizing the power transfer functions of the first Mach-Zehnder modulator and the second first Mach-Zehnder modulator according to an evaluation of said primary pilot signals.

7. The method according to claim 1, wherein
the first Mach-Zehnder modulator, the second Mach-Zehnder modulator, and the IQ modulator are controlled by bias signals.

8. The method according to claim 1, wherein
pilot modulation signals are combined with data modulation signals or with the bias signals which determine the power transfer functions of the first and the second Mach-Zehnder modulator.

9. The method according to claim 1, wherein
single sidebands data signals are generated in an upper and a lower optical sideband by the data modulation signals.

10. A system for controlling an IQ modulator, including a first Mach-Zehnder modulator and a parallel second Mach-Zehnder modulator, the system comprising a control unit adapted to
emit pilot modulation signals generating a first single sideband pilot signal in an upper sideband and a second single sideband pilot signal in a lower sideband,
receive electrical monitoring signals corresponding to conversion products of said first and second single sideband pilot signals emitted at an IQ modulator output; and
select and monitor at least one phase control signal and generate a phase bias signal controlling a phase difference between components of single sideband pilot signals output by the first Mach-Zehnder modulator and the second Mach-Zehnder modulator until said phase control signal becomes a minimum.

11. The system according to claim 10, wherein
the single sideband pilot signals are constant wave signals with different frequencies and
the phase control signal corresponds to a signal with a beat frequency of the single sideband pilot signals.

12. The system according to claim 10, wherein
the first single sideband pilot signal has a basic frequency and is additionally modulated by a first carrier modulation signal having a first carrier modulation frequency and the second single sideband pilot signal has a basic frequency and is additionally modulated by a second carrier modulation signal having a different carrier modulation frequency; and
the phase control signal is selected from the monitoring signals corresponding to a signal with a beat frequency of the carrier modulation signals.

13. The system according to claim 10, wherein
the control unit is adapted to generate further optical pilot signals and to detect and evaluate corresponding power control signals controlling power transfer functions of the first Mach-Zehnder modulator and the second Mach-Zehnder modulator.

14. The system according to claim 10, wherein the control unit and the IQ modulator are adapted to
monitor output signals emitted from the first Mach-Zehnder modulator and/or the second Mach-Zehnder modulator and convert the output signals into the monitoring signals, and
select and evaluate power control signals corresponding to primary pilot signals of the single sideband pilot signals for controlling power transfer functions of the first Mach-Zehnder modulator and the second Mach-Zehnder modulator.

15. The system according to claim 10, comprising means for combining pilot modulation signals or/and the I, Q components of the pilot signals with bias signals; and
1. feeding combined modulation signals to power bias ports of the IQ modulator.

* * * * *